Patented Feb. 16, 1954

2,669,066

UNITED STATES PATENT OFFICE 2,669,066

METHOD OF TREATING AND APPLYING LIVE POLLEN

Leo C. Antles, Wenatchee, Wash.

No Drawing. Application April 19, 1948,
Serial No. 21,860

12 Claims. (Cl. 47—58)

This invention relates to a method of treating and applying live pollen.

My prior Patent No. 2,430,659, issued November 4, 1947, discloses the use of Lycopodium clavatum as a substance for diluting and preserving the life and viability of live pollen.

In the culture of some types of plants, particularly self sterile fruits, it is often advantageous to resort to artificial or controlled pollination. Such controlled pollination is carried out by first gathering suitable inter-fertile pollen from the blossoms of selected plants or trees and then causing the pollen so gathered to be supplied to the blossoms needing the pollen service. After the pollen is gathered it can be applied in different ways to the blossoms to be pollinated. For instance it can be applied through the medium of honey bees, as explained in my prior Patent No. 2,435,951, issued February 17, 1948, or the pollen can be applied to selected blossoms one at a time as by means of a brush or cotton tipped applicator, or the pollen can be applied by blowing it into the blossoms, or it can be dusted over an entire tree or an entire orchard, or it can be mixed with water and applied in the form of a spray.

The pollen is composed of fine grains and it requires considerable time and labor to gather this pollen and get it ready for use. Also this pollen, if undiluted, deteriorates quite rapidly if it is kept at ordinary room temperatures or out-door temperatures after it is gathered. Thus the pollen is of a highly perishable nature. The above mentioned factors contribute to increase the cost of the pollen and to limit the available supply of pollen and to restrict shipment and distribution of the same. On this account it becomes very desirable to preserve the life and viability of the pollen to as great an extent as possible and to use the pollen as efficiently and economically as possible and to avoid wasting the same.

In accordance with my invention I mix the pollen with a carrier diluent which preserves the life and viability of the pollen and provides sufficient bulk to make possible easy and efficient handling and application of the pollen.

Objects of my invention are to provide a diluent for live pollen which will prolong the life and viability of the pollen, make it easier to handle the pollen and to apply the same to blossoms needing the pollen service and which will increase the efficiency of the pollen by making a given amount of said pollen go farther when it is applied in accordance with methods of controlled pollination.

I have established by research and experiment that certain qualities and characteristics are necessary and that certain other qualities and characteristics are desirable in a successful pollen diluent and preservative. The qualities and characteristics I have found to be necessary are: that the diluent should be a finely divided material having particles that are not greatly different in size from the grains of pollen to be diluted; that the diluent should be dry and essentially non-hygroscopic to the extent that it will not absorb moisture from the pollen with which it is mixed; that the diluent should be a product of high protein content; that the specific gravity of the diluent should not be greatly different from the specific gravity of the pollen with which it is used and should be between 1.15 and 1.30; that the electro-static characteristics of the diluent should be the same as that of pollen so that it will no tend to cause clustering of the diluent around the pollen grains and in this way interfere with stigmatic contact; and that the acid-alkaline chemical characteristics of the diluent, as expressed in iso-electric rating or pH units should be such that the diluent will not react chemically with the pollen and should be between 4.0 and 6.0 pH units.

I have discovered certain diluents hereinafter named which have the above mentioned qualities and characteristics to such an extent that they can be successfully used to dilute and preserve fruit tree pollen and certain other diluents which can be used in pollen that is to be used immediately after it is diluted.

Aside from having the qualities and characteristics above mentioned the substances which I have found to be suitable as pollen diluents and preservatives have been found to correspond closely to each other in the following: they have been found to have molecular weights in the order of 40,000 to 45,000; they have been found to be very slightly soluble in cold water but to be readily soluble in weak alkali solutions; they have been found to have a nitrogen content in the order of 14% to 16%.

The products I have found can be successfully used to dilute and preserve the life and viability of fruit tree pollen are animal products of high protein content known commercially as powdered egg albumin. Also I have found that a third high protein animal product known commercial as powdered milk can be used successfully to dilute live pollen, particularly in instances where the live pollen is to be used within a short time after it is diluted with the powdered milk. I have found that powdered skimmed milk is more desirable than powdered whole milk for use in diluting pollen.

I have found that powdered casein and powdered egg albumin both have beneficial effects in preserving the life and viability of live fruit tree pollen. Also I have found that mixtures of powdered casein, powdered egg albumin and powdered milk can be successfully used as diluents and that mixtures of powdered casein and powdered egg albumin are more desirable for this use than are mixtures in which powdered milk is used.

I have noted that powdered casein and powdered egg albumin correspond closely to each other in the following characteristics: they are both composed of particles comparable in size to the grains of fruit tree pollen; in hygroscopic characteristics they are both low as respects absorption of moisture. Dry powdered casein and egg albumin have a very low moisture content and do not give off a detrimental amount of moisture to the pollen, in this connection it is to be noted that pollen will absorb moisture readily; in protein content both powdered casein and powdered egg albumin are high; in specific gravity the rating of the two is substantially the same, namely 1.26; in molecular weight the rating of powdered casein is 45,000 and the rating of powdered egg albumin is 40,000; in iso-electric characteristics, as measured in pH units, the rating of powdered casein is 4.6 pH units and the rating of powdered egg albumin is 4.48 pH units; in solubility in cold water both are low, the solubility of powdered casein being one tenth of one percent and the solubility of powdered egg albumin being noted as slight; in alkalis both are readily soluble in dilute alkali solutions; in nitrogen content powdered casein is rated 15.50% and powdered egg albumin is rated 15.62%.

Powdered milk compares favorably with powdered casein and powdered egg albumin in most of the qualities and characteristics mentioned in the preceding paragraph except as respects its hygroscopic characteristics, which are high, in that it absorbs moisture readily and would draw moisture out of pollen causing it to deteriorate in viability rather rapidly. If mixtures of stored pollen and dry powdered milk are exposed to an atmosphere containing a humidity percentage greater than thirty percent the moisture will be readily absorbed by the powdered milk. The powdered milk thus offers no protection to the pollen against exposure to moisture. Excess moisture will damage the pollen. Thus the relatively high hygroscopic characteristics of powdered milk appear to greatly reduce its usefulness as a preservative of live pollen and render it less desirable for use as a diluent than are powdered casein and powdered egg albumin.

Having described my invention, what I claim as new is:

1. The method of preserving the life and viability of live pollen after it has been gathered from blossoms, comprising mixing said live pollen with a carrier diluent in the form of a powdered animal product of high protein content having an iso-electric rating expressed in pH units of from 4.0 to 6.0, a nitrogen content of 14% to 16%, a water absorbing characteristic expressed as non-hygroscopic, a specific gravity of from 1.15 to 1.30 and an electrostatic quality the same as that of the pollen.

2. The method of preserving the life and viability of live pollen after it has been gathered from blossoms, comprising mixing said live pollen with a carrier diluent in the form of a powdered animal product of high protein content having an iso-electric rating expressed in pH units of from 4.0 to 6.0, a nitrogen content of 14% to 16%, a water absorbing characteristic expressed as non-hygroscopic, and a specific gravity of from 1.15 to 1.30.

3. The method of preserving the life and viability of live pollen after it has been gathered from blossoms, comprising mixing said live pollen with a carrier diluent in the form of a powdered animal product of high protein content having an iso-electric rating expressed in pH units of from 4.0 to 6.0, a nitrogen content of 14% to 16%, and water absorbing characteristics expressed as non-hygroscopic.

4. The method of preserving the life and viability of live pollen after it has been gathered from blossoms, comprising mixing said live pollen with a carrier diluent in the form of a powdered animal product of high protein content having an iso-electric rating expressed in pH units of from 4.0 to 6.0, and a nitrogen content of from 14% to 16%.

5. The method of preserving the life and viability of live pollen after it has been gathered from blossoms, comprising mixing said live pollen with a carrier diluent in the form of a powdered animal product of high protein content having an iso-electric rating expressed in pH units of from 4.0 to 6.0.

6. The method of preserving the life and viability of live pollen after it has been gathered from blossoms, comprising mixing said live pollen with a carrier diluent in the form of a powdered animal product of high protein content.

7. The method of preserving the life and viability of live pollen after it has been gathered from blossoms, comprising mixing said live pollen with a carrier diluent of powdered casein.

8. The method of preserving the life and viability of live pollen after it has been gathered from blossoms, comprising mixing said live pollen with a carrier diluent of powdered egg albumin.

9. The method of controlling pollination which comprises applying to the blossoms to be pollinated a composition comprising live pollen and a carrier diluent in the form of a powdered animal product of high protein content.

10. The method of controlling pollination which comprises applying to blossoms to be pollinated a composition comprising live pollen and a carrier diluent of powdered casein.

11. The method of controlling pollination which comprises applying to blossoms to be pollinated a composition comprising live pollen and a carrier diluent of powdered egg albumin.

12. The method of controlling pollination which comprises applying to blossoms to be pollinated a composition comprising live pollen and a carrier diluent of powdered milk.

LEO C. ANTLES.

References Cited in the file of this patent

UNITED STATES PATENTS

| Number | Name | Date |
| --- | --- | --- |
| 1,914,364 | Eggert | June 20, 1933 |
| 2,092,460 | Lindstaedt | Sept. 7, 1937 |

OTHER REFERENCES

Proc. Am. Soc., Hort. Sci., vol. 27 of 1930 (pub. 1931), pp. 370–373.

Chem. Abstracts, vol. 33, col. 6391 (1939).

Botan. Gaz., vol. 100, pp. 844–852 (1939).

Hackh, Chemical Dictionary, 3rd ed., pp. 539 and 897 (1944).

Contrib. Boyce Thompson Inst., vol. 15, pp. 119–125 (1948).